United States Patent [19]

Major et al.

[11] 3,755,098

[45] Aug. 28, 1973

[54] CONTROL OF THE IMPURITY CONTENT OF ZINC SULPHATE SOLUTIONS

[75] Inventors: Graeme Alexander Major; Ian George Matthew, both of Tasmania, Australia

[73] Assignee: Electrolytic Zinc Company of Australasia Limited, Melbourne, Victoria, Australia

[22] Filed: May 13, 1971

[21] Appl. No.: 143,195

[30] Foreign Application Priority Data

May 25, 1970 Australia.............................. PA-1316

[52] U.S. Cl................. 204/55 R, 204/119, 423/106
[51] Int. Cl. ........................... C23b 5/12, C22d 1/22
[58] Field of Search...................... 23/55 US, 61 US; 204/55 R, 119

[56] References Cited
UNITED STATES PATENTS

| 200,134 | 2/1878 | Fahlberg.................................. 23/61 |
| 1,536,619 | 5/1925 | Nathansohn............................ 23/61 |
| 2,867,496 | 1/1959 | Sharples............................. 23/61 X |

Primary Examiner—F. C. Edmundson
Attorney—Ryder, McAulay & Hefter

[57] ABSTRACT

A process for controlling the build-up of undesirable ions in an electrolytic zinc plant circuit, comprises a step in which solution from said circuit is treated with a neutralising agent selected from the group consisting of limestone, calcium carbonate, zinc oxide, calcined zinc sulphide, calcined zinc sulphide concentrate, ammonia, ammonium hydroxide, dolomite, lime, calcium oxide, and calcium hydroxide, at a temperature in the range 65° C to the boiling point of the solution at atmospheric pressure, so as to precipitate substantially the whole zinc content thereof in a form in which the content of said undesirable ions is substantially lowered; and a step in which the zinc values contained in the precipitated zinc compounds are returned to the said zinc plant circuit. The undesirable ions are selected from the group consisting of $Cl^-$, $NO_3^-$, $NO_2^-$, $NH_4^+$, $ClO_4^-$, $ClO_3^-$, and the ions of the elements Mn, Mg, Cd, Co, Ni, Na, K, Cr, V, Se, Te, Sn, As, Sb, In, and Fe.

2 Claims, No Drawings

CONTROL OF THE IMPURITY CONTENT OF ZINC SULPHATE SOLUTIONS

This invention relates to a method of controlling the impurity content of zinc sulphate solutions, and in particular it relates to the impurity control of electrolytic zinc plant electrolytes.

According to the present invention there is provided a process for precipitating zinc in a form in which the content of undesirable ions as hereinafter defined is substantially lowered, which comprises treating a zinc sulphate solution with a suitable neutralizing agent as hereinafter defined at an elevated temperature so as to precipitate substantially the whole zinc content of the solution.

According to a preferred form of the invention there is provided a process for controlling the build-up of one or more undesirable ions, as hereinafter specified, in an electrolytic zinc plant circuit, which includes a step in which solution from the said circuit is treated with a neutralizing agent as hereinafter defined at an elevated temperature so as to precipitate substantially the whole zinc content thereof in a relatively insoluble form in which the content of undesirable ions as hereinafter defined is substantially lowered, the said undesirable ions remaining in the treated solution which may then be discarded, and a step in which the zinc values contained in the precipitated zinc compounds are returned to the said zinc plant circuit.

Undesirable ions are defined for the purposes of this invention as $Cl^-$, $NO_3^-$, $NO_2^-$, $NH_4^+$, $ClO_4^-$, $ClO_3^-$ and those of the elements Mn, Mg, Cd, Co, Ni, Na, K, Cr, V, Se, Te, Sn, As, Sb, In and Fe. Many of these ions are commonly found in electrolytic zinc plant circuit solutions. When zinc compounds are precipitated in accordance with the present invention, these undesirable ions are found to contaminate the precipitated zinc compounds to a substantially lowered extent, and, on filtration, the zinc values, from which a substantial proportion of impurities has been removed by the process, may be returned to the zinc plant circuit. The proportion of the undesirable ions which is removed from the zinc compounds by the process of this invention is normally in excess of 80 percent and in many cases is in excess of 90 percent.

Neutralizing agents suitable for use in accordance with the process of the invention are, limestone, calcium carbonate, zinc oxide, calcined zinc sulphide, calcined zinc sulphide concentrate, ammonia, ammonium hydroxide, dolomite, lime, calcium oxide, and calcium hydroxide. Residues, wastes and other materials containing calcium carbonate or other basic compounds may also be employed if other compounds present in these materials do not have a deleterious effect on the process of the invention.

The preferred neutralizing agent is limestone.

Preferably the circuit solution or a portion thereof is treated with the neutralizing agent at a temperature exceeding 65° C, more preferably at a temperature in the range 80° C to the boiling point of the solution at atmospheric pressure. When a solid neutralizing agent is used, it should be finely ground in most instances, preferably to a size of the order of −325 mesh Tyler. However, the degree of grinding of the neutralizing agent will be determined largely by economic considerations, and by the residence time that is desired in the process stage in which reaction with the neutralizing agent takes place.

The zinc sulphate solution may be treated in either continuous or batch type manner with a neutralizing agent at an elevated temperature in one or more vessels which are preferably provided with means for maintaining an appropriate degree of agitation of the zinc sulphate solution.

In cases where the zinc content of the zinc sulphate solution exceeds about 100 grams of zinc per litre, it may be desirable to dilute it with water to avoid the need for handling very viscous pulps in the neutralizing vessels.

The insoluable zinc compounds should be precipitated at a pH in the range 5.4 to 10.0. preferably at a pH in the range 5.5 to 9.0, and most preferably at a pH in the range 5.5 to 6.5.

When using powdered limestone in a batch type operation, foaming can occur to an undesirable extent due to the rapid evolution of carbon dioxide from the reacting powdered limestone. The foam produced may be advantageously controlled by water sprays or by a mechanical foam breaking impeller, or by blowing air on to the foam, or by suitably controlling the limestone addition rate, or by the use of an anti-foaming agent. Tributyl phosphate has been found to be an effective anti-foaming agent for this purpose. Foam is produced to a lesser extent from continuous operation.

When using powdered limestone, substantially complete precipitation of the zinc values from a zinc plant solution may usually be obtained by the addition of the limestone in an amount of from 100 grams to 500 grams per litre of zinc plant solution, preferably 140 grams to 200 grams per litre. However, it should be understood that these quantities are cited by way of guidance only. The amount of neutralizing agent required depends on a number of factors, including the zinc ion concentration and the acidity of the solution, and in any particular circumstances may readily be determined by experiment. The neutralizing agent may be added in one or more stages.

It is a feature of the process that the precipitated zinc compounds are readily amenable to solid-liquid separation by conventional techniques. The pulp has good settling properties and is readily thickened prior to filtration. The filter cake also may be thoroughly washed with water to remove the undesirable ions but without the loss of significant quantities of zinc values. The mean average holding time of the pulp after the addition of neutralizing agent and before filtering may vary between 1 minute and 48 hours. However, the actual holding time will be determined largely by economic considerations. If desired, the pulp may be cooled prior to solid-liquid separation.

The filter cake is very suitable for use as a neutralizing agent at an appropriate stage in the electrolytic zinc process, since it contains only minor quantities of undesirable ions. Use as a neutralizing agent is one way of returning the zinc values to the zinc plant circuit. If limestone is used as the neutralizing agent, the filter cake will contain gypsum and unreacted limestone as well as the precipitated zinc compounds, but this has no adverse affect on the use of the filter cake as a neutralizing agent.

Alternatively, the filter cake may be treated with sulphuric acid, electrolytic zinc plant spent electrolyte or electrolytic zinc plant spent electrolyte fortified with sulphuric acid, and the solution added at some suitable point in the zinc plant circuit. If limestone has been used as the neutralizing agent, then the gypsum precipitate remaining after treatment of the filter cake with sulphuric acid or fortified or unfortified spent electrolyte may be readily separated from the solution, for example, by thickening or filtration before the latter is added to the zinc plant circuit. The gypsum filter cake is readily washed. Other methods of using or treating the gypsum filter cake are obvious to those skilled in the art. Since the washed gypsum filter cake will normally be discarded from the circuit, any undesirable ions that it contains are also discarded from the circuit.

It is a further feature of the process of the invention that, when limestone is used as the neutralizing agent, sulphate ions are effectively removed from the zinc plant circuit by the formation of relatively insoluble gypsum which can be discarded. Sulphate ions are removed from the circuit as ammonium sulphate when either ammonia or ammonium hydroxide is used as the neutralizing agent. Although there is a tendency for fluoride and phosphate ions to be precipitated with the zinc values when limestone is used as the neutralizing agent, a useful degree of discard of these ions may still be achieved by the process of this invention.

The solution obtained after the separation of the precipitated zinc compounds, being substantially stripped of its zinc values but containing a substantial proportion of undesirable ions, may be discarded. Thereby control of the water volume of the circuit may be partially or completely effected without recourse to the evaporation of water.

When ammonia or ammonium hydroxide is used as the neutralizing agent, the ammonium sulphate produced may be recovered from the solution by evaporation and crystallization. If the last fraction of ammonium sulphate recovered by evaporation and crystallization is detrimentally contaminated with the undesirable ions, it may be desirable to treat the said last fraction of ammonium sulphate in solution with a neutralizing agent such as calcium oxide to recover the ammonia for re-use in the process of the invention. The equation for the reaction will be of the general type $$(NH_4)_2SO_4 + CaO = CaSO_4 + H_2O + 2NH_3.$$

This and other techniques will be known to those skilled in the art.

If limestone is used as the neutralizing agent and high grade washed gypsum is also produced, it will be obvious to those skilled in the art that the gypsum may be reacted with ammonia and carbon dioxide to give ammonium sulphate and calcium carbonate. The major portion of the carbon dioxide required can be obtained from the process of the invention, since carbon dioxide is evolved when limestone is used as the neutralizing agent. The calcium carbonate produced by the reaction between gypsum, ammonia and carbon dioxide can be re-used in the process of the invention. Such a procedure possesses the advantage that high grade ammonium sulphate can readily be produced.

Other procedures are also available to enable production of pure ammonium sulphate, if desired, utilizing the process of the invention as one step of the complete process.

Should it be desired to lower the solution zinc concentration to a level below that which is easily achieved by the process of the invention using limestone or calcium carbonate as the neutralizing agent, then the pH of the treated solution may be raised by the subsequent use of a more basic neutralizing agent such as calcium hydroxide to precipitate further amounts of zinc from the treated solution.

The process of the invention is readily adaptable for continuous operation and can easily be integrated into a conventional electrolytic zinc plant circuit to achieve the degree of impurity control desired.

The process of the invention is illustrated by the following non-limiting Examples:

EXAMPLE 1

In a batch type operation, a 2 litre sample of zinc plant solution was heated to 90° C and a slurry containing 300 grams of finely ground limestone (−400 mesh Tyler) in water was added. The froth was completely depressed by the addition of tributyl phosphate. Vigorous bubbling due to the reaction continued for about 25 minutes.

The temperature was maintained above 80° C for a total of 1½ hours, the pulp was cooled to 60° C over a period of 5 minutes and then immediately filtered. The filter cake was washed four times with 250 ml portions of distilled water and the washings included with the primary filtrate.

The average filter rate was 1.2 gallons per sq. ft. per minute through Whatman No. 2 filter paper on a 25 cm diameter Buchner funnel under a vacuum of approx. 20 inch Hg. The cake thickness was about 1 inch.

The filtrate, which was now substantially stripped of zinc values, was discarded and the wet filter cake pulped with 2 litres of aqueous sulphuric acid (containing 177.5 grams $H_2SO_4$ per litre and 10 mg $Cl^-$ per litre) for 15 minutes at ambient temperature.

The gypsum residue was then filtered off and washed four times with 250 ml portions of distilled water, the filter rate on this occasion being 0.6 gallons per sq. ft. per minute. The cake thickness was about one-third inch.

The following table summarises the data and results.

TABLE 1

| Ion | Ground Limestone % | Zinc Plant Solution (grams per litre) | discarded Filtrate+ washings grams per litre | reconstituted $ZnSO_4$ solution ex Acid pulp + washings grams per litre | gypsum residue dried at 110°C % |
|---|---|---|---|---|---|
| $Zn^{2+}$ | - | 106.9 | 0.79 | 56.4 | 0.22 |
| $Mg^{2+}$ | 0.2 | 3.2 | 1.71 | 0.06 | 0.2 |
| $Mn^{2+}$ | 0.04 | 2.81 | 2.08 | 0.112 | <0.01 |
| $Cl^-$ | 0.02 | 150×10⁻³ | 9×10⁻³ | 12×10⁻³ | 0.01 |
| $F^-$ | 0.038 | 23×10⁻³ | 20×10⁻³ | 16×10⁻³ | 0.004 |
| pH | - | 5.4 | 7.1 | 1.9 | - |
| Amount | 300 grams | 2.00 litres | 3.11 litres | 3.69 litres | 418.6 grams |

It is evident that a satisfactory separation of undesirable ions from the zinc originally in the plant solution was achieved, while at the same time substantially all of the zinc values were recovered in a solution quite suitable for returning to the plant circuit.

Table 2 shows the distribution of the ions from the limestone and zinc plant solution between the discard solution, gypsum residue and reconstituted $ZnSO_4$ solution.

TABLE 2

| Ion | Percentage of ion reported in | | |
|---|---|---|---|
| | reconstituted $ZnSO_4$ solution | discarded filtrate | gypsum residue |
| $Zn^{2+}$ | 98.4 | 1.2 | 0.4 |
| $Mg^{2+}$ | 3 | 82 | 15 |
| $Mn^{2+}$ | 7 | 93 | <1 |
| $Cl^-$ | 7 | 81 | 12 |
| $F^-$ | 40 | 45 | 15 |

EXAMPLE 2

A 2 litre sample of the same neutral zinc plant solution as used in Example 1 was treated with 350 grams of finely ground limestone, as used in Example 1. The limestone was added as an aqueous slurry after the solution temperature had been raised to 80° C. The rest of the procedure was the same as in Example 1.

The filter rate in the separation of the basic zinc sulphate-gypsum precipitate from the filtrate was fast but not measured.

After pulping the washed basic zinc sulphate-gypsum cake with acid to dissolve the zinc values, the gypsum was filtered off at a rate of 0.3 gallons per sq. ft. per minute. The results are tabulated below in Tables 3 and 4.

was washed four times with 250 ml of distilled water. The average filtration rate for the primary filtration plus all washes was 0.9 gallons per sq. ft. per minute (through 24 cm) diameter No. 2 grade Whatman paper under a vacuum of 20 inch Hg).

The damp filter cake which mostly comprised basic zinc sulphate and gypsum was repulped in 2.6 litres of zinc plant spent electrolyte (containing about 100 grams $H_2SO$ per litre) at ambient temperature. After 15 minutes the insoluble gypsum was filtered off and washed three times with 100 ml portions of distilled water. The filter rate was 0.07 gallons per sq. ft. per minute and cake thickness about one-half inch. When dried overnight at 110° C, the gypsum residue lost 57 percent of its weight. This loss would represent both free moisture and some bound water in the partial conversion to $CaSO_4 \cdot \frac{1}{2}H_2O$.

Table 5 summarises the data and results.

The limestone used in the experiments was taken from an open dump and the zinc content could be attributed to contamination by dust containing zinc.

Total chlorine implies the chlorine content of $ClO_4^-$, $ClO_3^-$ and $Cl^-$ ions. Very little $ClO_3^-$ was present.

| | Ground limestone (98%–400 Tyler). percent | Zinc plant solution (grams per litre) | Discarded filtrate plus washings (grams per litre) | Zinc plant electrolyte (grams per litre) | Reconstituted $ZnSO_4$ solution plus washings (grams per litre) | Gypsum residue (dried at 100° C.). percent |
|---|---|---|---|---|---|---|
| Ion: | | | | | | |
| $Zn^{2+}$ | 0.16 | 115.2 | 8.1 | 47.0 | 102.0 | 2.1 |
| $Mg^{2+}$ | 0.3 | 2.9 | 2.3 | 2.9 | 2.4 | 0.1 |
| $Mn^{2+}$ | 0.05 | 7.7 | 5.5 | 7.1 | 5.5 | 0.2 |
| $SO_4^{2-}$ | <0.15 | 195 | 37.0 | 212 | 172.5 | 60.0 |
| Total Cl | | $346 \times 10^{-3}$ | $260 \times 10^{-3}$ | $345 \times 10^{-3}$ | $265 \times 10^{-3}$ | |
| $Cl^-$ | 0.005 | $205 \times 10^{-3}$ | $157 \times 10^{-3}$ | $200 \times 10^{-3}$ | $155 \times 10^{-3}$ | |
| pH | | 5.4 | 6.1 | | 2.5 | |
| Amount | 300 grams | 2.0 litres | 2.52 litres | 2.6 litres | 3.21 litres | 446 grams |

TABLE 3

| Ion | Reconstituted $ZnSO_4$ solution ex acid pulp + washings grams per litre | discard filtrate + washings (grams per litre) | gypsum residue (dried at 110°C) % |
|---|---|---|---|
| $Zn^{2+}$ | 61.4 | 0.54 | 0.095 |
| $Mg^{2+}$ | 0.09 | 2.1 | 0.1 |
| $Mn^{2+}$ | 0.163 | 1.53 | <0.01 |
| $Cl^-$ | $10 \times 10^{-3}$ | $92 \times 10^{-3}$ | 0.006 |
| $F^-$ | $20 \times 10^{-3}$ | $20 \times 10^{-3}$ | 0.007 |
| pH | 2.1 | 7.0 | - |
| Amount | 3.38 litres | 3.21 litres | 489 grams |

TABLE 4

| Ion | Perceltage of Ion Reported In | | |
|---|---|---|---|
| | Reconstituted $ZnSO_4$ solution | Discarded Filtrate | Gypsum Residue |
| $Zn^{2+}$ | 99 | 0.8 | 0.2 |
| $Mg^{2+}$ | 4 | 89 | 7 |
| $Mn^{2+}$ | 9 | 90 | 1 |
| $Cl^-$ | 4 | 87 | 9 |
| $F^-$ | 40 | 40 | 20 |

EXAMPLE 3

A 2 litre sample of zinc plant solution was heated to 90° C, and 300 grams of finely ground limestone was added as a slurry in distilled water. Tributyl phosphate was used to control foaming. The pulp was stirred for 40 minutes at about 90° C (80° to 95° C) and was filtered 10 minutes later after cooling to 50° C. The cake Table 6 indicates the effectiveness of the process in removing impurity ions and also sulphate from the neutral zinc plant solution.

TABLE 6

Percent of ion removed from the zinc plant solution =
$$\frac{\text{ion contained in (discard filtrate + gypsum-limestone)}}{\text{ion contained in zinc plant solution}} \times 100$$

| Ion | |
|---|---|
| $Zn^{2+}$ | 13 |
| $Ng^{2+}$ | 92 |
| $Mn^{2+}$ | 95 |
| $SO_4^{2-}$ | 92 |
| Total Cl | 95 |
| $Cl^-$ | 97 |

It is evident from Table 5 that a significant reduction in the volume of zinc plant circuit solution has been effected. Two litres of neutral zinc plant solution plus 2.6 litres of zinc plant spent electrolyte produced 3.21 litres of purified zinc sulphate solution, i.e., a reduction of 30 percent.

EXAMPLE 4

The process of the invention was also operated successfully on a continuous basis using two mechanically stirred reaction vessels in series. Each steam jacketed vessel was of 8 litre capacity. Finely ground limestone and zinc plant neutral electrolytic-cell feed solution were added separately to the first vessel at constant rates; the limestone was added from a conveyor belt and the feed solution via a metering pump. Samples of the pulp which overflowed from the first and then the second vessel, were collected at regular intervals, filtered without cooling or washing, and the filtrates and solid residues analysed.

In one test of 65 hours continuous running, 13 samples of pulp were taken. The means of the results obtained from each sample are given below.

OPERATING CONDITIONS

Mean temperatures: 1st reaction vessel = 95° C
2nd reaction vessel = 89° C
Mean Total pulp residence time = 2.1 hours
Limestone addition = 150 grams per litre of feed solution
Flow Rates -
 (i) Limestone = 750 grams per hour
 (ii) Feed Solution = 83 ml. per minute

TABLE 7

| Ion | limestone assays | Feed solution assays |
|---|---|---|
| $Zn^{2+}$ | 0.6% | 117.6 grams per litre |
| $Mn^{2+}$ | 0.06% | 6.65 grams per litre |
| $Mg^{2+}$ | 1.0% | 3.35 grams per litre |
| $Cl^-$ | 0.005% | 182 mg. per litre |
| $F^-$ | 0.003% | 20 mg. per litr |

The limestone was ground to 97 percent minus 400 mesh Tyler.

Distilled water was added constantly to both vessels to make up for estimated evaporation losses.

TABLE 8

Mean percentage of the total mass of ion in the overflow pulp which was present in the filtrate

| Ion | filter cake not washed | Filter cake washed |
|---|---|---|
| $Zn^{2+}$ | 5.5% | 6.3% |
| $Mn^{2+}$ | 81% | 93% |
| $Mg^{2+}$ | 71% | 83% |
| $Cl^-$ | 84% | 98% |
| $F^-$ | 4% | 39% |

Mean pH of filtrate (25°C) = 6.3
Mean pH of pulp overflowing from 2nd vessel (25°C) = 6.5
Mean Buchner filtration rate of pulp Samples = 1.1 gallons per sq. ft. per min.

(11 cm diameter Whatman No. 2 filter paper, vacuum = 22 inch Hg).
Mean moisture content of damp filter cake = 30.5%
Mean percentage of unreacted $CO_3^{2-}$ = 14% calculated using the relation —
Total mass of $CO_3^{2-}$ in the 13 filter cake samples
Total mass of $CO_3^{2-}$ in limestone required to produce 13 pulp samples

EXAMPLE 5

The process of the invention was also successfully operated on a continuous basis using four mechanically stirred tank reactors, each of 50 gallons capacity, in series. The tank reactors were heated directly by the injection of live steam. Zinc plant neutral electrolytic-cell feed solution and finely ground limestone were added to the first tank reactor; the feed solution was added at a constant rate from a head tank by manual control and the limestone was added from a vibratory feeder at a rate, which was automatically controlled, to maintain a set value for the pulp pH in the final tank reactor. Provision was made for the addition of water to the tank reactors for the purpose of making up evaporation losses and for pulp dilution. Samples of the pulp which overflowed from each tank reactor were collected at regular intervals, filtered and washed and the liquids and solids analysed.

The operating conditions and the results of three tests are given below in Tables 9 and 10. In each list the feed solution contained 117 grams per litre of $Zn^{++}$ and 20 grams per litre of $Mn^{++}$; other operating conditions are tabulated below in Tables 9 and 10.

TABLE 9.—OPERATING CONDITIONS

| | Temperature in each tank (° C.) | | | | Overall pulp residence time (hours) | Pulp pH in final tank | Ratio of the volume of water added to feed solution |
|---|---|---|---|---|---|---|---|
| | 1 | 2 | 3 | 4 | | | |
| Test A | 59 | 95 | 95 | 95 | 3.9 | 6.13 | 1:1 |
| Test B | (*) | 95 | 95 | 95 | 1.8 | 6.29 | None |
| Test C | 50 | 95 | 95 | 95 | 4.1 | 5.93 | 1:1 |

* Tank 1 not used.

TABLE 10

Results
Mean percent of the total mass of ion in the overflow pulp from the final tank reactor which was present in the combined filtrate and washings.

| | $Zn^{++}$ | $Mn^{++}$ |
|---|---|---|
| Test A | 8.4 | 91.0 |
| Test B | 6.6 | 89.5 |
| Test C | 9.5 | 94.1 |

Claims for U.S.A. and Canada:

1. In the process for controlling the build-up of a group of undesirable ions in an electrolytic zinc plant circuit using as the electrolyte a solution comprising zinc sulphate, said group of undesirable ions comprising $Cl^-$, $ClO_3^-$, $ClO_4^-$, and ions of the elements Mn and Mg, the improvement comprising the step of removing solution from said circuit, the step of treating said solution with a neutralizing agent selected from the group consisting of calcium carbonate, zinc oxide, calcined zinc sulphide, dolomite, calcium oxide and calcium hydroxide at a temperature in the range 65° C to the boiling point of the solution at atmospheric pressure, and a pH in the range 5.4 to 10.0, thereby precipitating zinc in salt from comprising basic zinc sulphate, which salt is readily separable from the solution, the solution after precipitation containing more than 80 percent of each of the ions in said group of undesirable ions in the solution before precipitation, the step of recovering the zinc salt and discarding the solution after recovery of the zinc salt, and the further step of returning the zinc to said circuit.

2. In the process for controlling the build-up of undesirable ions in an electrolytic zinc plant circuit using as the electrolyte a solution comprising zinc sulphate, said undesirable ions being selected from the group consisting of $Cl^-$, $ClO_3^-$, $ClO_4^-$ and ions of the elements Mn and Mg, the improvement comprising the step of removing solution from said circuit, the step of treating said solution with limestone, at a temperature in the range of 80° C to the boiling point of the solution at atmospheric pressure and a pH in the range of 5.5 to 6.5, thereby precipitating zinc in salt form comprising basic zinc sulphate, which salt is readily separable from the solution, the solution after precipitation containing more than 80 per cent of each of the ions in said group of undesirable ions in the solution before precipitation, the step of recovering the zinc salt and discarding the solution after recovery of the zinc salt, and the further step of returning the zinc to said circuit.

* * * * *